United States Patent
Corinti et al.

(10) Patent No.: US 10,626,212 B2
(45) Date of Patent: Apr. 21, 2020

(54) POLYURETHANE PREPOLYMERS

(71) Applicant: Dow Global Technologies LLC, Midland, MI (US)

(72) Inventors: Elisa Corinti, Milan (IT); Gianluca Casagrande, Milan (IT)

(73) Assignee: Dow Global Technologies LLC, Midland, MI (US)

( * ) Notice: Subject to any disclaimer, the term of this patent is extended or adjusted under 35 U.S.C. 154(b) by 27 days.

(21) Appl. No.: 15/742,584

(22) PCT Filed: Jul. 6, 2015

(86) PCT No.: PCT/IT2015/000178
§ 371 (c)(1),
(2) Date: Jan. 8, 2018

(87) PCT Pub. No.: WO2017/006357
PCT Pub. Date: Jan. 12, 2017

(65) Prior Publication Data
US 2018/0201717 A1    Jul. 19, 2018

(51) Int. Cl.
| C08G 18/12 | (2006.01) |
| C08G 18/10 | (2006.01) |
| C08G 18/48 | (2006.01) |
| C08G 18/76 | (2006.01) |
| C08G 18/18 | (2006.01) |
| C08G 18/20 | (2006.01) |
| C08G 18/28 | (2006.01) |

(52) U.S. Cl.
CPC ............ *C08G 18/12* (2013.01); *C08G 18/10* (2013.01); *C08G 18/1833* (2013.01); *C08G 18/2063* (2013.01); *C08G 18/283* (2013.01); *C08G 18/4812* (2013.01); *C08G 18/4816* (2013.01); *C08G 18/4825* (2013.01); *C08G 18/4837* (2013.01); *C08G 18/4841* (2013.01); *C08G 18/7664* (2013.01); *C08G 18/7671* (2013.01)

(58) Field of Classification Search
CPC .... C08G 18/12; C08G 18/10; C08G 18/4837; C08G 18/4841; C08G 18/4816; C08G 18/4812; C08G 18/4825; C08G 18/2063; C08G 18/1833; C08G 18/283; C08G 18/7671; C08G 18/7664
See application file for complete search history.

(56) References Cited

U.S. PATENT DOCUMENTS

| 6,391,935 | B1 | 5/2002 | Hager et al. |
| 7,452,525 | B1 | 11/2008 | Berezkin et al. |
| 9,364,577 | B2 * | 6/2016 | Niesten ................ A61L 15/425 |
| 2011/0294911 | A1 | 12/2011 | Schoberger |
| 2018/0051122 | A1 * | 2/2018 | Sophiea ............ C08G 18/4825 |

FOREIGN PATENT DOCUMENTS

| WO | WO-2012150224 A1 * | 11/2012 | ........... A61L 15/425 |
| WO | WO-2014067430 A1 * | 5/2014 | ........... C08G 18/706 |

OTHER PUBLICATIONS

International Search Report & Written Opinion for related PCT Application PCT/IT2015/000178, dated Mar. 17, 2016 (43 pgs).
International Preliminary Report on Patentability for related PCT Application PCT/IT2015/000178, dated Aug. 25, 2017 (11 pgs).

* cited by examiner

*Primary Examiner* — Rabon A Sergent
(74) *Attorney, Agent, or Firm* — Brooks, Cameron & Heubsch, PLLC

(57) ABSTRACT

Embodiments of the present disclosure are directed to polyurethane prepolymers, more particularly, to polyurethane formulations including a polyurethane prepolymer that can form polyurethanes. As an example, a polyurethane formulation can include a polyurethane prepolymer and a polyol composition including polyols, water, and a catalyst, where the polyurethane prepolymer is a reaction product of a monol and an excess amount of a polyisocyanate.

5 Claims, No Drawings

POLYURETHANE PREPOLYMERS

This application is a National Stage Application under 35 U.S.C. § 371 of International Application Number PCT/IT2015/000178, filed Jul. 6, 2015 and published as WO 2017/006357 on Jan. 12, 2017, the entire contents of which are incorporated herein by reference in its entirety.

FIELD

Embodiments relate to polyurethane prepolymers, more particularly, to polyurethane formulations including a polyurethane prepolymer that can form polyurethanes.

BACKGROUND

Polyurethanes may be used in a variety of applications. Depending upon an application, a particular aesthetic quality and/or mechanical performance of polyurethane may be desired. Prepolymers can be used in the formation of polyurethanes. A prepolymer generally refers to an intermediate such as a liquid intermediate between polyols and final polyurethane. For example, a polyol can be reacted with an excess of isocyanates to form an isocyanate tipped prepolymer. Qualities of the prepolymer (e.g., a type and/or a total number of one or more functional groups reacted on the prepolymer) can influence properties such as a molecular weight and/or viscoelastic properties of a resultant polyurethane.

As such, with respect to varying properties of polyurethanes depending upon an application thereof, one method is vary a structure and/or a composition of a prepolymer used in the manufacture of the polyurethane. However, varying a structure and/or a composition of a prepolymer may have an undesirable impact on other properties (e.g., decreased resiliency and/or a decreased durability) of the resultant polyurethane. Accordingly, a need exists for polyurethane prepolymer that promote desired mechanical properties in resultant polyurethanes without undesirably impacting other mechanical properties of the resultant polyurethane.

SUMMARY

As used herein, a polyurethane prepolymer refers a reaction product of a monol having an average hydroxyl functionality of 1 and a polyisocyanate. In various examples, a polyurethane prepolymer can refer to a reaction product of a monol having an average hydroxyl functionality of 1, where the monol is from 1 weight percent (wt %) to 60 wt % of constitutional units derived from ethylene oxide (EO) and a polyisocyanate. In some examples, a polyurethane prepolymer can be a reaction product of a monol and a polyisocyanate, where the monol has an average hydroxyl functionality of 1, is from 1 wt % to 60 wt % of constitutional units derived from ethylene oxide (EO), has a primary hydroxyl group content from 15 percent (%) to 60%, and has a number average equivalent weight from 500 to 1700. Embodiments may be realized by forming and curing a polyurethane formulation that includes a polyurethane prepolymer, as discussed, and a polyol composition including polyols, water, and a catalyst.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Polyurethane prepolymers, polyurethane formulations including a polyurethane prepolymer, and polyurethanes formed therefrom are disclosed herein. Polyurethanes may be used in a variety of applications. Depending upon an application, a particular aesthetic quality and/or mechanical performance of polyurethane may be desired. Polyols are often used to form polyurethanes. Polyols (e.g., the polyol compositions disclosed herein) can be combined with isocyanates to form polyurethane formulations. The polyurethane formulations can be cured to form polyurethanes such as semi-rigid foams. Polyurethanes are polymers including chains of units joined by carbamate links, which may be referred to as urethane links.

As mentioned the polyurethane formulation disclosed herein may be utilized to form semi-rigid foams. For example and in contrast to previous polyurethanes, the polyurethanes herein have a number of desirable viscoelastic properties (e.g., a desired hysteresis loss). That is, as detailed in FR 1487458, monols with a high EO content (e.g., greater than 60% EO) may act as cell openers in some approaches and/or, as detailed in WO 9606874, the addition of monols may decrease a polyurethane foam density. However, approaches such as those in FR 1487458 and/or WO 9606874 add a monol to a "polyol side" of a reaction, do not employ a monol, and/or utilize a "one shot" approach to form polyurethanes that may not have desirable properties (e.g., do not have a desirable hysteresis loss).

Surprisingly, the polyurethanes formulations, which include the polyurethane prepolymers disclosed herein can be utilized to provide polyurethanes (e.g., viscoelastic foams having the density, compression set, indentation force deflection (ILD), compression load deflection (CLD), while simultaneously providing a number of other desirable properties such as a desired hysteresis loss. For instance, the polyurethanes disclosed herein can include viscoelastic foams having a hysteresis loss greater than 32% as measured according to ISO 2439B Chap. 7.1, and/or a CLD at 40% of approximately 2.7 kilopascals as measured according to ISO 3386, with the proviso that hardness is measured during a first cycle.

As used herein, "polyol" refers to an organic molecule, e.g., polyether, having an average hydroxyl functionality of greater than 1.0 hydroxyl groups per molecule. For instance, a "diol" refers to a organic molecule having an average hydroxyl functionality of 2 and a "triol" refers to an organic molecule having an average hydroxyl functionality of 3.

As used herein, "monol" refers to an organic molecule, e.g., polyether, having an average hydroxyl functionality of 1.0 hydroxyl groups per molecule.

In various embodiments herein, a polyurethane prepolymer is formed. The polyurethane prepolymer is formed as the reaction product of a monol and a polyisocyanate.

Suitable monols include monofunctional polyethers having an average hydroxyl functionality of 1. As used herein, a "average hydroxyl functionality" (i.e., an average nominal hydroxyl functionality) refers to a number average functionality, e.g., a number of hydroxyl groups per molecule, of a polyol or a polyol composition based upon a number average functionality, e.g., a number of active hydrogen atoms per molecule, of initiator(s) used for preparation. As used herein, "average" refers to number average unless indicated otherwise.

For example, those monols which are made by reacting a starter component with one active hydrogen per molecule with multiple equivalents of an epoxide such as ethylene oxide, propylene oxide, butylene oxides, or the like, or mixtures thereof. The epoxide can be polymerized using well-known techniques and a variety of catalysts, including alkali metals, alkali metal hydroxides and alkoxides, double metal cyanide complexes, and many others. The preferred starters are monoalcohols (methanol, ethanol, propanol, phenols, allyl alcohol, higher molecular weight alcohols, or the like). The monols can also be made by first producing a polyoxyalkylene diol or triol and then converting a controlled percentage of the hydroxyl groups to groups that are not reactive towards isocyanates; using known methods thus yielding a suitable monofunctional content. The monol may be obtained commercially for example from The Dow Chemical Company. The monol can be formed to a particular monol (i.e., a single monol) or can be formed of a mixture of different monols. In either case, all hydroxyl groups of the monol are reacted with an excess number of isocyanate groups of a polyisocyanate prior to adding the polyol composition, as described herein.

Embodiments of the present disclosure provide that the monol has from 1 wt % to 60 wt % of constitutional units derived from ethylene oxide and 40 wt % to 90 wt % of constitutional units derived from propylene oxide. All individual values and subranges from 1 wt % to 60 wt % of constitutional units derived from ethylene oxide are included; for example, the monol can have from a lower limit of 1 wt %, 5 wt %, 8 wt %, 15 wt %, or 20 wt % to an upper limit of 60 wt %, 50 wt %, or 30 wt % of constitutional units derived from ethylene oxide. Correspondingly, all individual values and subranges from 40 wt % to 95 wt % of constitutional units derived from propylene oxide are included; for example, the first polyether polyol can include a polymer chain having from a lower limit of 40 wt %, 50 wt %, or 60 wt % to an upper limit of 95 wt %, 80 wt %, or 70 wt % of constitutional units derived from propylene oxide. In some embodiments, the monol is from 5 wt % to 60% wt % of constitutional units derived from EO. The monol can, in some embodiments, have from 5 wt % to 50 wt % of constitutional units derived from EO.

The monol can have a number average equivalent weight from 120 to 2000. All individual values and subranges from 120 to 2000 are included; for example, the monol can have a number average equivalent weight from a lower limit of 120, 400, 500, or 750 to an upper limit of 2000, 1700, 1600, 1500, 1400, or 1000.

The monol can have a primary hydroxyl content of from 15-60%. By primary hydroxyl group it is meant a terminally located hydroxyl-containing group (e.g., on a polyoxyalkylene polyol such as a polyoxypropylene polyol). All individual values and subranges from 15 to 60 are included; for example, the monol can have a primary hydroxyl content from a lower limit of 15, 30, or 35 to an upper limit of 60, 50, 45, or 40.

The polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example. The polyisocyanate may be obtained commercially. Examples of commercial isocyanates include, but are not limited to, isocyanates available from The Dow Chemical Company.

The polyisocyanates can include various types of isocyanates including aliphatic, cycloaliphatic and araliphatic polyisocyanates. For example, the polyisocyanates can be diisocyanates, such as hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and/or methylene diphenyl isocyanates (MDI) having an isocyanate functionality of at least two. In some examples, the polyisocyanate is a mixture of diisocyanates. For example, the mixture of diisocyanates can include a mixture of different isocyanates including Isocyanate 1, Isocyanate 2, and/or Isocyanate 3, as described herein.

Embodiments of the present disclosure provide that the isocyanate can have an average isocyanate functionality from 2.0 to 3.2. All individual values and subranges from 2.0 to 3.2 are included; for example, the isocyanate can have an average isocyanate functionality from a lower limit of 2.0, 2.2, or 2.3 to an upper limit of 3.2, 3.0, or 2.8. In some examples, the isocyanate can have an average isocyanate functionality up to 3.2.

Embodiments of the present disclosure provide that the polyisocyanate can have a number average isocyanate equivalent weight from 100 to 160. All individual values and subranges from 100 to 160 are included; for example, the isocyanate can have a number average isocyanate equivalent weight from a lower limit of 100, 105, or 110 to an upper limit of 160, 136, or 125.

The polyisocyanate can be utilized such that the polyurethane formulation has an isocyanate index in a range from 50 to 120. Isocyanate index can be defined as a quotient, multiplied by one hundred, of an actual amount of isocyanate utilized and a theoretical amount of isocyanate for curing. All individual values and subranges from 50 to 120 are included; for example, the polyurethane formulation can have an isocyanate index from a lower limit of 50, 60, or 70 to an upper limit of 120, 110, or 100.

In various embodiments, at least one isocyanate functional group of the polyisocyanate is reaction terminated by a polyether chain of the monol in the formed polyurethane prepolymer. In some embodiments, an excess amount of a polyisocyanate such that all hydroxyl groups of the monol are reacted (e.g., reaction terminated by a polyether chain of the monol) is utilized when forming the polyurethane prepolymer, as described herein.

In some embodiments, polyurethane prepolymer is formed of the reaction product of the monol and the polyisocyanate reacted in the presence of a polyol. For example, such a polyol can be a polyol with an average hydroxyl functionality of 3, a hydroxyl group content from 30% to 85%, and a hydroxyl equivalent weight from 1000 to 2000. That is, some embodiments of the present disclosure provide that such a polyol is nominally a triol.

Embodiments herein provide polyurethane formulation that when cured forms polyurethanes, as described herein. The polyurethane formulation can include polyurethane prepolymer formed of a reaction product of a monol and a polyisocyanate, as discussed above, a polyol composition, water, and a catalyst.

The polyol composition can include a first polyol, a second polyol, a third polyol, and, a fourth polyol. The first polyol can have an average hydroxyl functionality from 3 to 7, have from 5 wt % to 25 wt % of constitutional units derived from EO, have a primary hydroxyl group content of from 70% to 85%, and can be from 5 wt % to 15 wt % of a total wt % of the polyol composition. The second polyol can have an average hydroxyl functionality from 2 to 6, 0% of constitutional units derived from EO, a primary hydroxyl group content of 0%, and can be 5 wt % to 25 wt % of a total wt % of the polyol composition. The third polyol can have an average hydroxyl functionality from 3 to 7, have from 50 wt % to 70 wt % of constitutional units derived from EO, have a primary hydroxyl group content of from 40% to 60%, and can be 20 wt % to 40 wt % of a total wt % of the polyol composition. The fourth polyol has an average hydroxyl functionality from 3 to 7, have from 60 wt % to 80 wt % of constitutional units derived from EO, have a primary hydroxyl group content of from 80% to 95%, and can be from 20 wt % to 40 wt % of a total wt % of the polyol composition. Regarding the above ranges, all individual values and subranges from respective lower and upper limits are included.

The first polyol, the second polyol, and the third polyol can be prepared using known methods. For instance, the polyols can be polyether polyols prepared via base-catalyzed oxyalkylation. For base-catalyzed oxyalkylation, a hydric low molecular weight starter molecule, such as propylene glycol or glycerine, or sorbitol can be reacted with one or more alkylene oxides; such as ethylene oxide or propylene oxide, to form a polyether polyol, (e.g., a first polyol, the second polyol, the third polyol, and/or the fourth polyol). Another manufacturing method can utilize DMC catalysis. Among the processes that may be utilized to prepare the first polyether polyol, the second polyether polyol, the third polyether polyol, and the fourth polyol are those discussed in U.S. Pat. Nos. 3,728,308, 5,158,922; 5,470,813; 5,689,012; 6,077,978; and 7,919,575, among others. The first polyol, the second polyol, the third polyether polyol, may be obtained commercially for example from The Dow Chemical Company.

The polyurethane formulation can include a catalyst. The catalyst can be an amine catalyst, a metallic catalyst, and combinations thereof. Examples of amine catalysts include N,N-dimethylaminoethyl, N,N-dimethyl-3-amino-propyl, triethylenediamine, pentamethyldiethylene-triamine, triethylamine, tributyl amine, dimethylethanolamine, N,N,N',N'-tetra-methylethylenediamine, dimethylbenzylamine, N,N, N',N'-tetramethylbutanediamine, dimethylcyclohexylamine, triethylenediamine, and combinations thereof, among others. Examples of metallic catalysts include tin(II) salts of organic carboxylic acids, e.g., tin(II) diacetate, tin(II) dioctanoate, tin(II) diethylhexanoate, stannous octoate, and tin (II) dilaurate, and dialkyltin(IV) salts of organic carboxylic acids, e.g., dibutyltin diacetate, dibutyltin dilaurate, dibutyltin maleate and dioctyltin diacetate, and combinations thereof, among others. Catalysts are available commercially and include those available under trade names such as NIAX™, POLYCAT™, and DABCO™, among others.

Some embodiments of the present disclosure provide that the catalyst is from 0.05 wt % to 3 wt % of a total wt % of the polyol composition. All individual values and subranges from 0.05 wt % to 3 wt % parts are included; for example, the catalyst can be from a lower limit of 0.05 wt %, 0.1 wt %, or 0.5 wt % to an upper limit of 5 wt %, 3 wt %, or 2 wt % of a total wt % of the polyol composition.

The polyurethane formulation can include water. Water can be present from 0.5 wt % to 5 wt % a total wt % of the polyol composition. All individual values and subranges from 0.5 wt % to 5 wt % parts are included; for example, the catalyst can be from a lower limit of 0.5, 1.0, or 2.0 wt % to an upper limit of 5.0, 3.5, or 2.2 wt % of a total wt % of the polyol composition.

The polyurethane formulation can include a surfactant. The surfactant may help to emulsify components of the polyurethane formulation, regulate cell size of a resultant foam, and/or stabilize a cell structure to help prevent collapse and/or sub-surface voids. Examples of surfactants include silicon-based compounds such as silicone oils and organosilicone-polyether copolymers, such as polydimethyl siloxane and polydimethylsiloxane-polyoxyalkylene block copolymers (e.g., polyether modified polydimethyl siloxane), and combinations thereof. Examples of surfactants include silica particles and silica aerogel powders, as well as organic surfactants such as nonylphenol ethoxylates. Surfactants are available commercially and include those available under trade names such as NIAX™, DABCO™, and TEGOSTAB™, among others.

Some embodiments of the present disclosure provide that surfactant, when utilized, is from 0.1 wt % to 1.5 wt % of a total wt % of the polyol composition. All individual values and subranges from 0.1 parts to 1.5 parts are included; for example, the surfactant can be from a lower limit of 0.1, 0.2, or 0.3 parts to an upper limit of 1.5, 1.3, or 1.0 per 100 of a total wt % of the polyol composition.

Some embodiments of the present disclosure provide that the polyurethane formulation can include one or more additional components. Different additional components and/or different amounts of the additional components may be utilized for various applications. Examples of additional components include liquid and/or solid pigments, colorants, flame-retardants, crosslinkers, fillers, chain extenders, antioxidants, surface modifiers, bioretardant agents, mold release agents, and combinations thereof, among others. Some embodiments of the present disclosure provide that crosslinkers and chain extenders are not utilized.

The polyurethane formulation has an isocyanate index in a range from 50 to 120, as discussed, and when cured, as described herein, forms a viscoelastic foam having a hysteresis loss greater than 32% as measured according to ISO 2439B Chap. 7.1, as described herein. That is, the polyurethane formed from the polyurethane formulations including the polyurethane prepolymers described herein, provide various desirable viscoelastic properties along with other desirable properties.

Polyurethane formulations disclosed herein can be prepared by curing the polyurethane formulation in the presence of a polyurethane prepolymer. In various embodiments herein, a method for forming a polyurethane formulation can include preparing a reaction mixture that includes a monol and an excess amount of a polyisocyanate and allowing the reaction mixture to react to form a polyurethane prepolymer.

The monol can be up to 30 wt % of the reaction mixture. For example, the monol can be from 0.5 wt % to 30 wt % of the reaction mixture and where the polyisocyanate is from 10 wt % to 85 wt % of a total wt % of the reaction mixture. All individual values and subranges from 0.5 wt % to 30 wt % and 10 wt % to 85 wt % are included; for example, the monol can be from a lower limit of 0.5 wt %, 1 wt %, 5 wt %, 10 wt %, or 15 wt % to an upper limit of 30 wt %, 25 wt %, or 20 wt % of a total wt % of the reaction mixture and the polyisocyanate can be from a lower limit of 10 wt %, 15%, 20% to an upper limit of 25%, 30%, 40%, 73% or 85 wt % of a total wt % of the reaction mixture.

In various embodiments, a polyol composition is prepared. The polyol composition, as discussed, can include the first polyol, the second polyol, the third polyol, and the fourth polyol. The polyol composition, along with a catalyst, and water can be added to the reaction mixture to form a polyurethane formulation. Notably, such addition occurs after formation of the polyurethane prepolymer, as discussed. Accordingly, in some embodiments, all hydroxyl groups of the monol are reacted with an excess number of isocyanate groups of the polyisocyanate, as discussed, prior to admixing the polyol composition to the reaction mixture (e.g., adding the polyol composition to the reaction mixture).

As mentioned and in contrast to previous polyurethanes, the polyurethanes disclosed herein have a number of desirable viscoelastic properties. For instance, the polyurethanes formed from the polyurethane compositions including the polyurethane prepolymers of Working Examples 1 and 2 have improved hysteresis loss values 50.8% (by ILD)/50.3% (by CLD) and 32.2% (by ILD)/35.6% (by CLD), respectively) as compared to the hysteresis loss values (28.3%/31.5%, 27.0%/29.1%, and 31.1%/30.8%) of the polyurethanes of Comparative Examples A, B, and C. Notably, the isocyanate indexes of Working Examples 1-2 and the Comparative Examples A-B-C are the same and the respective densities are similar and thus the enhanced hysteresis loss properties are attributed to the presence of the polyurethane prepolymer formed of the reaction product of reaction product of a monol and an isocyanate. That is, while an isocyanate index, among other items, can influence a resultant property (e.g., hysteresis loss) of a polyurethane, polyurethane prepolymers, as described herein, facilitate an improved (i.e., greater) hysteresis loss of cured polyurethane formulations as compared to other approaches that may employ a one shot approach and/or do not employ polyurethane prepolymers formed of a reaction product of a monol and an isocyanate.

In addition, the polyurethanes made with Working Examples 1-2 are comparatively softer in terms of ILD (stress 40%) (126 N and 131 N) and CLD (stress 40%) (2.7 kilopascals (kPa) and 2.8 kPa) compared with Comparative Examples A, B, and C (211 N; 139 N and 160 N by ILD, respectively, and 4.2 kPa; 2.8 kPa and 3.2 kPa by CLD, respectively). Being comparatively softer can result in a comparatively improved ease of processing (e.g., wider working window during processing) in addition to the enhanced hysteresis loss value.

EXAMPLES

Analytical Methods:

OH number can be calculated as =33×% OH, with % OH=1700/hydroxyl equivalent weight of the polyol.

Hydroxyl equivalent weight of the polyol=MW of the polyol/functionality.

Water (wt %) can be calculated as a total weight % of water as a portion of a total weight percent of a formulated polyol.

Isocyanate index: Isocyanate index values are equal to a quotient, multiplied by one hundred, of an actual amount of isocyanate utilized and a theoretical amount of isocyanate for curing.

Determination of Mechanical Properties:

Density and compression set (75%) are determined in accordance with ASTM D 3574. Load bearing and hysteresis loss measured in terms of ILD stress deformation at 40% and ILD hysteresis loss are determined in accordance with ISO 2439-B Chap. 7.1 (first cycle) and CLD stress deformation at 40% and CLD hysteresis loss are determined in accordance with ISO 3386-1 (no precycles) for polyurethanes formed by curing polyurethane formulations including a polyisocyanate (e.g., polyurethane formulations having an isocyanate index in a range from 50 to 120) and the respective polyols of the Working Examples 1-2 and Comparative Examples A-B-C.

The following materials are principally used:

| | |
|---|---|
| Monol 1 | An alkoxylated monol having an ethylene oxide (EO) content of approximately 60 weight percent (wt %) EO, a number average equivalent weight of approximately 500, and a primary hydroxyl group content from 15 percent (%) to 20%. |
| Monol 2 | An alkoxylated monol having an EO content of approximately 8 wt % EO, a number average equivalent weight of approximately 1600, and a primary hydroxyl group content from 55% to 60%. |
| Polyol 1 | A triol having an EO content of approximately 78% (random), an equivalent weight of approximately 1675, and primary hydroxyl group content of approximately 45%. |
| Polyol 2 | A polyol having average hydroxyl functionality of 3, 7, having an EO content of approximately 15%, an equivalent weight of approximately 1760, and primary hydroxyl group content of approximately 77%. |
| Polyol 3 | A diol having an EO content of 0%, an equivalent weight of approximately 1000, and primary hydroxyl group content of 0%. |
| Polyol 4 | A triol having an EO content of approximately 60%, an equivalent weight of approximately 1000, and primary hydroxyl group content of 40%. |
| Polyol 5 | A triol having an EO content of approximately 70%, an equivalent weight of approximately 1500, and primary hydroxyl group content of 90%. |
| Isocyanate 1 | A polyisocyanate formed of a mixture of diisocyanates (98/2 blend of 4, 4 modified monomeric diphenylmethane diisocyanate (MMDI) and 2, 4 MMDI) having an isocyanate equivalent weight of approximately 125. |
| Isocyanate 2 | A polyisocyanate formed of a mixture of diisocyanates (50/50 blend of 4, 4 MMDI and 2, 4 MMDI) having an isocyanate equivalent weight of approximately 125. |
| Isocyanate 3 | A polyisocyanate formed of a mixture of diisocyanates (MMDI and pure monomeric diphenylmethane diisocyanates) having an isocyanate equivalent weight of approximately 136. |
| Catalyst 1 | An amine catalyst formed of Bis(N,N-dimethylaminoethyl) ether (70%) in dipropylene glycol, available from Momentive as NIAX ® A1. |
| Catalyst 2 | An amine catalyst formed of Bis(N,N-dimethyl-3-aminopropyl)amine, available from Air Products and Chemicals, Inc. as POLYCAT ® 15. |
| Catalyst 3 | An amine catalyst formed of 33% triethylenediamine in dipropylene glycol, available from Sigma-Aldrich as DABCO ® 33LV. |
| Surfactant | A silicone surfactant, available from Evonik as TEGOSTAB ® B 8409. |

Working Examples 1 and 2 and Comparative Examples A, B, and C are prepared using the above materials according to the conditions outlined in Tables 1 and 2, below. Referring to Table 2, the total OH number can be calculated as the sum of the respective OH number of the components the calculation of which is discussed above. With continued reference to Table 2, the total water can be calculated as discussed above. Referring to Table 3, the isocyanate index is determined as discussed above. With continued reference to Table 3, the mechanical properties including density and compression set are determined in accordance with ASTM D 3574, while load bearing and hysteresis loss measured in terms of ILD stress deformation at 40% and ILD hysteresis loss are determined in accordance with ISO 2439-B Chap. 7.1 (first cycle) while CLD stress deformation at 40% and CLD hysteresis loss are determined in accordance with ISO 3386-1 (no precycles), as discussed above.

TABLE 1

|  | EX 1 | EX 2 | CE A-C |
|---|---|---|---|
| Isocyanate 1 (wt %) | 16.2 | 16.2 | 20.0 |
| Isocyanate 2 (wt %) | 35.4 | 35.3 | 43.7 |
| Isocyanate 3 (wt %) | 21.7 | 21.6 | 26.8 |
| Polyol 1 (wt %) | 7.7 | 7.7 | 9.5 |
| Monol 1 (wt %) | 19.0 | — | — |
| Monol 2 (wt %) | — | 19.3 | — |
| Total wt % | 100 | 100 | 100 |
| NCO (%) | 22.2 | 23.2 | 29.3 |

TABLE 2

|  | CE B | EX 1 | CE C | EX 2 | CE A |
|---|---|---|---|---|---|
| Polyol 2 (wt %) | 10.0 | 11.1 | 10.0 | 11.1 | 11.1 |
| Polyol 3 (wt %) | 15.0 | 16.7 | 15.0 | 16.7 | 16.7 |
| Monol 1 (wt %) | 10.0 | — | — | — | — |
| Monol 2 (wt %) | — | — | 10.0 | — | — |
| Catalyst 1 (wt %) | 0.1 | 0.1 | 0.1 | 0.1 | 0.1 |
| Catalyst 2 (wt %) | 0.5 | 0.6 | 0.5 | 0.6 | 0.6 |
| Polyol 4 (wt %) | 30.5 | 34 | 30.5 | 34 | 34 |
| Water (wt %) | 2.0 | 2.2 | 2.0 | 2.2 | 2.2 |
| Surfactant (wt %) | 0.4 | 0.4 | 0.4 | 0.4 | 0.4 |
| Catalyst 3 (wt %) | 0.1 | 0.1 | 0.1 | 0.1 | 0.1 |
| Polyol 5 (wt %) | 31.4 | 34.8 | 31.4 | 34.8 | 34.8 |
| Total wt % | 100 | 100 | 100 | 100 | 100 |
| Total OH (milligram (mg) of KOH/g) | 84.7 | 85.8 | 80.7 | 85.8 | 86.0 |
| Total water (wt %) | 2.0 | 2.2 | 2.0 | 2.2 | 2.2 |

TABLE 3

|  | CE A | EX 1 | CE B | EX 2 | CE C |
|---|---|---|---|---|---|
| Isocyanate index | 85 | 85 | 85 | 85 | 85 |
| Density (kg/m3) | 84 | 84 | 82 | 82 | 83 |
| Compression set 75% (%) | 2.6 | 3.0 | 2.1 | 2.1 | 1.7 |
| ILD (stress 40%) Newtons (N) | 139 | 126 | 160 | 131 | 211 |
| ILD Hysteresis (%) | 28.3 | 50.8 | 27.0 | 32.2 | 31.1 |
| CLD (stress 40%) kilopascals (kPa) | 2.8 | 2.7 | 3.2 | 2.8 | 4.2 |
| CLD Hysteresis (%) | 31.5 | 50.3 | 29.1 | 35.6 | 30.8 |

Working Example 1 (i.e., EX 1) is a polyurethane formulation including a polyurethane prepolymer where the polyurethane prepolymer is a reaction product of the Monol 1 and an excess amount of a polyisocyanate provided by the combination of the Isocyanates 1-3. In particular, Working Example 1 is prepared using the following method: A reactor vessel is charged with the Isocyanate 1 (16.2 g), Isocyanate 2 (35 g), Isocyanate 3 (21.7 g), the Polyol 1 (7.7 g), and the Monol 1 (19 g) and allowed to react at approximately 70° C. for 2 hours at ambient pressure of approximately 100 kPa under a nitrogen blanket. Following 2 hours the reaction was brought to ambient temperature of approximately 23° C. and after 24 hours at ambient temperature the reaction was deemed complete and the polyurethane prepolymer formed. A polyol composition is prepared by adding to a vessel the following components: Polyol 2 (11.1 g), the Polyol 3 (16.7 g), the Catalyst 1 (0.1 g), the Catalyst 2 (0.6 g), the Polyol 4 (34 g), the Water (2.2 g), the Surfactant (0.4 g), the Catalyst 3 (0.1 g), and the Polyol 5 (34.8 g). The added components of the polyol composition are mixed until they are in a homogeneous phase in the vessel. 100 g of the polyol composition is mixed with 64 g of the polyurethane prepolymer (i.e., isocyanate pre-reacted with the monol) to form the Working Example 1 polyurethane formulation that when cured forms a viscoelastic foam having a desired hysteresis loss.

Working Example 2 is a polyurethane formulation including polyurethane prepolymer where the polyurethane prepolymer is a reaction product of the Monol 2 and an excess amount of a polyisocyanate provided by the combination of the Isocyanates 1-3. In particular, Working Example 2 is prepared using the following method: A reactor vessel is charged with the Isocyanate 1 (16.2 g), Isocyanate 2 (35.3 g), Isocyanate 3 (21.6 g), the Polyol 1 (7.7 g), and the Monol 2 (19.3 g) and allowed to react at approximately 70° C. for 2 hours at ambient pressure of approximately 100 kPa under a nitrogen blanket. Following 2 hours the reaction was brought to ambient temperature of approximately 23° C. and after 24 hours at ambient temperature the reaction was deemed complete and the polyurethane prepolymer formed. A polyol composition is prepared by adding to a vessel the following components: the Polyol 2 (11.1 g), the Polyol 3 (16.7 g), the Catalyst 1 (0.1 g), the Catalyst 2 (0.6 g), the Polyol 4 (34 g), the Water (2.2 g) the Surfactant (0.4 g), the Catalyst 3 (0.1 g), and the Polyol 5 (34.8 g). The added components of the polyol composition are mixed until they are in a homogeneous phase in the vessel. 100 g of the polyol composition is mixed with 61 g of the polyurethane prepolymer to form the Working Example 2 polyurethane formulation that when cured forms a viscoelastic foam having a desired hysteresis loss.

Notably, in both Working Example 1 and Working Example 2, all hydroxyl groups of the Monol 1 and the Monol 2, respectively, are reacted prior to adding a polyol composition (i.e., prior to adding each of the components described in Table 2). That is, Working Examples 1 and 2 use a two-step approach (formation of the polyurethane prepolymer using a monol and subsequent addition of the polyol composition to the polyurethane) in contrast to other approaches that may employ a one shot approach and/or do not employ monols to form polyurethane formulations.

Comparative Example A (i.e., CE. A) is a polyurethane formulation prepared without the Monol and when cured does not produce a polyurethane having the desired properties (e.g., a comparatively high hysteresis loss). In particular, Comparative Example A is prepared with a reactor vessel charged with the Isocyanate 1 (20 g), Isocyanate 2 (43.7 g), Isocyanate 3 (26.8 g) and the Polyol 1 (9.5 g), allowed to react at approximately 70° C. for 2 hours at ambient pressure of approximately 100 kPa under a nitrogen blanket. Following 2 hours the reaction was brought to ambient temperature of approximately 23° C. and after 24 hours at ambient temperature the reaction was deemed complete and the polyurethane prepolymer formed. A polyol composition is prepared by adding to a vessel the following components: Polyol 2 (11.1 g), the Polyol 3 (16.7 g), the Catalyst 1 (0.1 g), the Catalyst 2 (0.6 g), the Polyol 4 (34 g), the Water (2.2 g), the Surfactant (0.4 g), the Catalyst 3 (0.1 g), and the Polyol 5 (34.8 g). The added components of the polyol composition are mixed until they are in a homogeneous phase in the vessel. 100 g of polyol composition is mixed with 48.5 g of the polyurethane prepolymer formed without a monol to form the Comparative Example A polyurethane formulation.

Comparative Example B is polyurethane formulation prepared with the Monol 1 included in a polyol composition without employing a monol to form a prepolymer and when cured does not produce a polyurethane having the desired properties (e.g., a comparatively high hysteresis loss). In particular, Comparative Example B is prepared with the same polyurethane prepolymer of Comparative Example A. A polyol composition is prepared by adding to a vessel the following components: the Polyol 2 (10 g), the Polyol 3 (15 g), the Monol 1 (10 g), the Catalyst 1 (0.1 g), the Catalyst 2 (0.5 g), the Polyol 4 (30.5 g), the Water (2 g), the Surfactant (0.4 g), the Catalyst 3 (0.1 g), and the Polyol 5 (31.4 g). The added components of the polyol composition are mixed until they are in a homogeneous phase in the vessel. 100 g of the polyol composition is mixed with 45.5 g of the polyurethane prepolymer formed without a monol to form the Comparative Example B polyurethane formulation.

Comparative Example C is polyurethane formulation prepared with the Monol 2 included in a polyol composition without employing a monol to form a prepolymer and when cured does not produce a polyurethane having the desired properties (e.g., a comparatively high hysteresis loss). In particular, Comparative Example B is prepared with the same polyurethane prepolymer of Comparative Examples A and B. A polyol composition is prepared by adding to a vessel the following components: Polyol 2 (10 g), the Polyol 3 (15 g), the Monol 2 (10 g), the Catalyst 1 (0.1 g), the Catalyst 2 (0.5 g), the Polyol 4 (30.5 g), the Water (2 g), the Surfactant (0.4 g), the Catalyst 3 (0.1 g), and the Polyol 5 (31.4 g). The added components of the polyol composition are mixed until they are in a homogeneous phase in the vessel. 100 g of the polyol composition is mixed with 44.5 g of the polyurethane prepolymer formed without a monol to form the Comparative Example C polyurethane formulation.

As shown in Table 3 below, isocyanate indexes of Working Examples 1 and 2 and those of Comparative Examples A-B-C are the same and the respective densities are similar, however, the hysteresis loss properties of the Working Examples 1 and 2 are enhanced (i.e., larger) relative to the hysteresis loss properties of the Comparative Examples A-B-C. As used herein, the hysteresis loss (%) is equal to a difference between an area between the compression and releasing curves of a graph generated in accordance with the applicable standard (e.g., ISO 2439-B Chap. 7.1 no precycles) and an area below the compression curve.

For instance, the polyurethanes formed from the polyurethane compositions including the polyurethane prepolymers of Working Examples 1 and 2 have improved hysteresis loss values 50.8% (by ILD)/50.3% (by CLD) and 32.2% (by ILD)/35.6% (by CLD), respectively) as compared to the hysteresis loss values (28.3%/31.5%, 27.0%/29.1%, and 31.1%/30.8%) of the polyurethanes of Comparative Examples A, B, and C. Notably, the isocyanate indexes of Working Examples 1-2 and the Comparative Examples A-B-C are the same and the respective densities are similar, and thus the enhanced hysteresis loss properties are attributed to the presence of the polyurethane prepolymer formed of the reaction product of a monol and an isocyanate. That is, while an isocyanate index, among other items, can influence a resultant property (e.g., hysteresis loss) of a polyurethane, polyurethane prepolymers, as described herein, facilitate an improved (i.e., greater) hysteresis loss of cured polyurethane formulations as compared to other approaches that may employ a one shot approach and/or do not employ polyurethane prepolymers formed of a reaction product of a monol and an isocyanate.

In addition, the polyurethanes made with Working Examples 1-2 are comparatively softer in terms of ILD (stress 40%) (126 N and 131 N) and CLD (stress 40%) (2.7 kPa and 2.8 kPa) compared with Comparative Examples A, B, and C (211 N; 139 N and 160 N by ILD, respectively, and 4.2 kPa; 2.8 kPa and 3.2 kPa by CLD, respectively). Being comparatively softer can result in a comparatively improved ease of processing (e.g., wider working window during processing) in addition to the enhanced hysteresis loss value.

The invention claimed is:

1. A polyurethane formulation comprising:
   a polyurethane prepolymer, where the polyurethane prepolymer is a reaction product of a monol, having an average hydroxyl functionality of 1 and from 1 wt % to 60 wt % of constitutional units derived from ethylene oxide (EO), and an excess amount of a polyisocyanate such that all hydroxyl groups of the monol are reacted; and
   a polyol composition including polyols, water, and a catalyst,
   where the polyurethane formulation when cured forms a viscoelastic foam having a hysteresis loss greater than 32% as measured according to ISO 2439B Chap. 7.1.

2. The polyurethane formulation of claim 1, where polyols includes a first polyol with an average hydroxyl functionality from 3 to 7, has 5 wt % to 25 wt % of constitutional units derived from EO, a primary hydroxyl group content of from 70% to 85, and is 5 wt % to 15 wt % of a total wt % of the polyol composition, a second polyol with an average hydroxyl functionality from 2-6, 0% of constitutional units derived from EO, a primary hydroxyl group content of 0%, and is 5 wt % to 25 wt % of a total wt % of the polyol composition, a third polyol with an average hydroxyl functionality of 3, 7, from 50 wt % to 70 wt % of constitutional units derived from EO, a primary hydroxyl group content of from 40% to 60%, and is 20 wt % to 40 wt % of a total wt % of the polyol composition, and a fourth polyol has an average hydroxyl functionality from 3 to 7, 60 wt % to 80 wt % of constitutional units derived from EO, a primary hydroxyl group content of from 80% to 95%, and is from 20 wt % to 40 wt % of a total wt % of the polyol composition.

3. The polyurethane formulation of claim 1, where the polyurethane formulation has an isocyanate index in a range from 50 to 120.

4. A two-step method for forming a polyurethane formulation, comprising:
   preparing a reaction mixture that includes a monol and an excess amount of a polyisocyanate and allowing the reaction mixture to react to form a polyurethane prepolymer, where the monol is from 0.5 weight percent (wt %) to 30 wt % of a total wt % of the reaction mixture and where the polyisocyanate is from 10 wt % to 85 wt % of the reaction mixture, and where the monol is from 1 wt % to 60 wt % of constitutional units derived from ethylene oxide (EO); and
   adding a polyol composition including polyols, a catalyst, and water to the reaction mixture after formation of the polyurethane prepolymer to form a polyurethane formulation, where the polyurethane formulation has an isocyanate index in a range from 50 to 120,
   where the polyurethane formulation when cured forms a viscoelastic foam having a hysteresis loss greater than 32% as measured according to ISO 2439B Chap. 7.1.

5. The method of claim 4, where all hydroxyl groups of the monol are reacted with an excess number of isocyanate groups of the polyisocyanate prior to adding the polyol composition.

* * * * *